2,834,789
Patented May 13, 1958

2,834,789
PROCESS OF PREPARING LOWER ALKYL 2,3,6-TRIHYDROXYBENZOATE, AND INTERMEDIATES THEREFOR

Niels K. F. W. Clauson-Kaas, Haifa, Israel, assignor to A/S Sadolin & Holmblad, Copenhagen, Denmark No Drawing. Application February 15, 1955
Serial No. 488,405

6 Claims. (Cl. 260—347.5)

This invention relates to a new process for preparing known triesters of hydroxyhydroquinone and to new intermediates utilizable in the preparation thereof.

The process of this invention essentially comprises converting a 2,5-dialkoxy-2,5-dihydro-2-furoic acid ester to a 2,5-dialkoxy-2,5-dihydro-2-furoyl acetic acid ester, thence to a 2,3,6-trihydroxy-benzoic acid ester, and finally to the known triesters of hydroxyhydroquinone (e. g. hydroxyhydroquinone triacetate).

This series of steps can be represented schematically by the following equations:

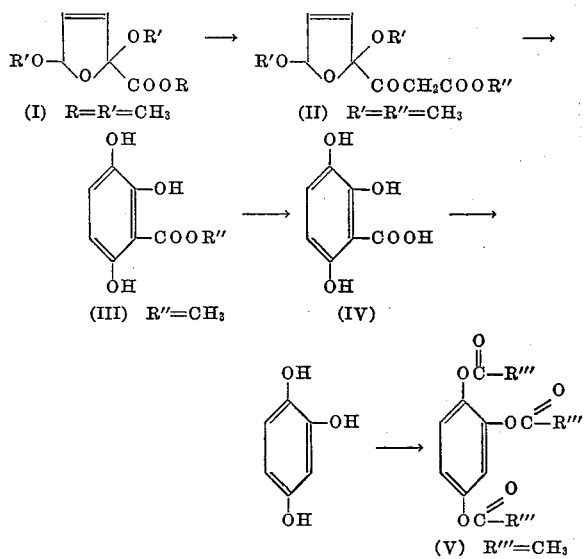

The 2,5-dialkoxy-2,5-dihydro-2-furoic acid esters are known compounds which can be prepared from furoic acid esters as disclosed in an article in Acta Chemica Scandinavica, 6, 551–555 (1952). Representative of these starting materials are the lower alkyl 2,5-di (lower alkoxy)-2,5-dihydro-2-furoic acid esters, such as the methyl, ethyl, n-propyl, and n-butyl esters of 2,5-dimethoxy-2,5-dihydro-2-fuoric acid, 2,5-diethoxy-2,5-dihydro-2-furoic acid, and 2,5-di(n-propoxy)-2,5-dihydro-2-furoic acid. These 2,5-dialkoxy-2,5-dihydro-2-furoic acid esters are reacted in accordance with the method of this invention with an ester of acetic acid, such as a lower alkyl acetate (e. g. methyl acetate) in the presence of a condensing agent such as an alkali metal (e. g. sodium), an alkali metal alkoxide (e. g. sodium methoxide), or an alkali metal amide (e. g. sodamide). This reaction is optimally, but not necessarily, conducted at an elevated temperature (such a temperature in the range of 40° C. to 100° C.) to speed the rate of reaction.

The 2,5-dialkoxy-2,5-dihydro-2-furoyl acetic acid esters, thus formed, wherein the 2,5-dialkoxy substituents correspond to those of the 2,5-dialkoxy radicals of the furoic acid ester reactant and the alcohol moiety of the ester grouping corresponds to the alcohol moiety of the acetate reactants are new compounds. Representative of these new intermediates are the lower alkyl 2,5-di(lower alkoxy)-2,5-dihydro-2-furoyl acetic acid esters, such as the methyl, ethyl, n-propyl, and n-butyl esters of 2,5-dimethoxy-2,5-dihydro-2-furoyl acetic acid, 2,5-diethoxy-2,5-dihydro-2-furoyl acetic acid, and 2,5-di(n-propoxy)-2,5-dihydro-2-furoyl acetic acid. These 2,5-dialkoxy-2,5-dihydro-2-furoyl acetic acid esters are then hydrolyzed with an aqueous acid, such as a dilute mineral acid (e. g. dilute hydrochloric acid or dilute sulfuric acid) to yield an ester of 2,3,6-trihydroxybenzoic acid. The esters of 2,3,6-trihydroxybenzoic acid, such as the lower alkyl esters of 2,3,6-trihydroxybenzoic acid, thus formed, wherein the alcohol moiety of the ester grouping corresponds to alcohol moiety of the furoyl acetic acid ester reactant, are new compounds. They can be hydrolyzed to the free acid, which in turn can be decarboxylated by heating to form hydroxyhydroquinone or decarboxylated and esterified by heating with an acyl halide or acid anhydride in the presence of a tertiary base. These hydrolysis, decarboxylation and esterification steps can be done in sequence in separate reactions or together in situ. The hydrolysis is effected by means of an acid, such as a mineral acid (e. g. 3 N hydrochloric acid). Among the acylating agents which can be used are lower alkanoyl halides (e. g. acetyl chloride) and lower alkanoic anhydrides (e. g. acetic anhydride). Although any tertiary base may be used, pyridine is representative of this group. The heating is optimally done at the reflux temperature of the tertiary base.

The triesters of hydroxyhydroquinone (e. g. the triacetate of hydroxyhydroquinone) are known compounds which are disclosed, inter alia, in "Organic Synthesis," Collective Volume 1, second edition, Gilman and Blatt, pages 317–318 (1938).

The following examples are illustrative of this invention:

EXAMPLE 1

*2,5-dimethoxy-2,5-dihydro-2-furoyl acetic acid methyl ester (II)*

51.7 g. (0.275 mole) of 2,5-dimethoxy-2,5-dihydro-2-furoic acid methyl ester (I) is placed in a flask fitted with a stirrer, dropping funnel and a reflux condenser and heated with stirring to 90°. 0.7 mm. sodium wire (18.5 g. 0.81 mole) and methyl acetate (60.7 g., 0.82 mole) are added at 30–60 minute intervals in six portions of equal size. During each addition of sodium the stirrer is stopped. As the reaction mixture becomes more and more viscous, benzene (70 ml. in all) is added. After the reaction, methanol (30 ml.) is added dropwise to remove residual sodium and the mixture left standing with stirring and heating over-night. The solution is cooled to −10° and poured with efficient stirring into a mixture of concentrated hydrochloric acid (90 g., 0.89 mole) and 170 g. of cracked ice. The dark brown mixture is extracted rapidly with cold ether (500+100+ 100 ml.) and the ethereal solution washed with a 2 M solution of potassium bicarbonate (300 ml.) and dried with magnesium sulfate. The ether is removed by distillation and the residue distilled further under 0.1–0.2 mm. from an oil bath (60–120°). After a fore-run of methyl acetoacetate, about 43.4 g. (69%) of 2,5-dimethoxy-2,5-dihydro-2-furoyl acetic acid methyl ester (II) is obtained [slightly yellow oil, B. P. 87–114° (main portion about 104–114°), $n_D{}^{25}$ 1.4588].

$C_7H_5O_3(OCH_3)_3$ (230.2).—Calc.: C, 52.2; H, 6.1; $OCH_3$, 40.4. Found: C, 52.6; H, 6.3; $OCH_3$, 39.4.

In a similar manner, if 2,5-diethoxy-2,5-dihydro-2-furoic acid ethyl ester is substituted for the 2,5-dimethoxy-2,5-dihydro-2-furoic acid methyl ester in the procedure of Example 1, 2,5-diethoxy-2,5-dihydro-2-furoyl acetic acid ethyl ester is produced.

EXAMPLE 2

*2,3,6-trihydroxybenzoic acid methyl ester (III)*

2.30 g. of 2,5-dimethoxy-2,5-dihydro-2-furoyl acetic acid methyl ester (II) is shaken for 10 minutes with hydrochloric acid (0.1 N, 20 ml.) under carbon dioxide. Hereby a homogeneous solution was obtained, which is left standing for 8 days. A light-violet precipitate is removed by filtration, washed with water and dried. The yield is about 1.05 g. (54%) of 2,3,6-trihydroxybenzoic acid methyl ester [M. P. about 131–135°].

$C_7H_5O_4(OCH_3)$ (184.1).—Calc.: C, 52.2; H, 4.4; $OCH_3$, 16.9. Found: C, 52.4; H, 4.4; $OCH_3$, 16.8.

The product gives a reddish-brown ferric chloride reaction. After two crystallizations from methanol-water, the M. P. is raised to about 138°. Further crystallization does not change the M. P.

Similarly, 2,5-diethoxy-2,5-dihydro-2-furoyl acetic acid ethyl ester gives 2,3,6-trihydroxybenzoic acid ethyl ester.

EXAMPLE 3

*2,3,6-trihydroxybenzoic acid (IV)*

2,3,6-trihydroxybenzoic acid methyl ester (III) is hydrolyzed to 2,3,6-trihydroxybenzoic acid (IV) by refluxing the ester with 5% aqueous potassium carbonate solution to form the potassium salt and then neutralizing in an ice bath with a 10% aqueous hydrochloric acid solution.

EXAMPLE 4

*Hydroxyhydroquinone triacetate (V)*

300 mg. of 2,3,6-trihydroxybenzoic acid methyl ester (III) is heated under reflux (3 hr.) with hydrochloric acid (3 N, 10 ml.) in an atmosphere of nitrogen. The solution is extracted with ether (15+15 ml.), the ethereal solution dried with magnesium sulfate and the ether distilled. The oily residue is heated under reflux (10 min.) with a mixture of acetic anhydride and pyridine (3 ml.). The reaction mixture is evaporated to dryness under 0.5 mm. on a water-bath (60°) and the oily residue dissolved in ether. The etheral solution is purified with carbon black and most of the ether removed by distillation. Hereby about 95 mg. (23%) of hydroxyhydroquinone triacetate (V) crystallizes (white crystals, M. P. about 86–88°).

$C_6H_3O_3(COCH_3)_3$ (252.2).—Calc.: C, 57.1; H, 4.8; $COCH_3$, 51.2. Found: C, 56.4; H, 5.0; $COCH_3$, 51.0.

The infrared spectrum of the product is identical with that of an authentic sample. After crystallization from benzene-petroleum ether the M. P. is raised to about 95° (previously found 96–97°).

If propionic acid anhydride is substituted for acetic anhydride in the process of Example 4, hydroxyhydroquinone tripropionate is produced. Furthermore, if 2,3,6-trihydroxybenzoic acid ethyl ester is substituted for the methyl ester (III) of Example 4, the same compound (V) is formed.

The invention may be variously otherwise embodied within the scope of the appended claims.

I claim:

1. Lower alkyl 2,5-di(lower alkoxy)-2,5-dihydro-2-furoyl acetate.

2. Methyl 2,5-dimethoxy-2,5-dihydro-2-furoyl acetate.

3. The process of claim 6 wherein methyl 2,5-dimethoxy-2,5-dihydro-2-furoate is reacted with methyl acetate.

4. The process for preparing lower alkyl 2,3,6-trihydroxybenzoate, which comprises hydrolyzing lower alkyl 2,5-di(lower alkoxy)-2,5-dihydro-2-furoyl acetate.

5. The process of claim 4 wherein methyl 2,5-dimethoxy-2,5-dihydro-2-furoyl acetate is hydrolyzed.

6. A process for preparing lower alkyl 2,5-di(lower alkoxy)-2,5-dihydro-2-furoyl acetate, which comprises heating lower alkyl 2,5-di(lower alkoxy)-2,5-dihydro-2-furoate with lower alkyl acetate in the presence of a condensing agent selected from the class consisting of an alkali metal, an alkali metal alkoxide, and an alkali metal amide.

References Cited in the file of this patent

UNITED STATES PATENTS 2,615,042  Von Bramer et al. _____ Oct. 21, 1952

OTHER REFERENCES

Beilstein, 10: (mainwork) 466 and 469 (1927).
Horii et al.: J. Pharm. Soc., Japan, vol. 72, pages 1520–22 (1952).
Chem. Abst. 47:80406.